United States Patent

Takahashi et al.

[11] Patent Number: 5,254,045
[45] Date of Patent: Oct. 19, 1993

[54] FLAT BELT DRIVING DEVICE

[75] Inventors: Mitsuhiko Takahashi; Katsuya Yamaguchi; Yoshihisa Nakano; Hiroshi Matsuoka; Arao Umeda; Shinya Yuki; Sadao Tanimoto, all of Kobe, Japan

[73] Assignee: Bando Chemicals Industries, Ltd., Kobe, Japan

[21] Appl. No.: 777,938

[22] Filed: Oct. 17, 1991

[30] Foreign Application Priority Data

Oct. 23, 1990 [JP] Japan .................. 2-286252
Jan. 22, 1991 [JP] Japan .................. 3-5553

[51] Int. Cl.[5] .................. F16H 57/00; F16H 55/48
[52] U.S. Cl. .................. 474/92; 474/191
[58] Field of Search .......... 474/90, 92, 94, 100, 474/143, 151, 163, 166, 191, 167, 184, 185, 187, 190, 263, 264; 29/895.23; 19/114; 51/292; 140/97

[56] References Cited

U.S. PATENT DOCUMENTS

| 88,635 | 4/1869 | Ingram | 51/242 |
|---|---|---|---|
| 426,575 | 4/1890 | Weatherhead | 140/97 |
| 1,490,377 | 4/1924 | Freeman | 474/92 |
| 2,002,079 | 5/1935 | Dickie | 19/114 |
| 2,268,459 | 12/1941 | Murray | 19/114 |
| 2,488,442 | 11/1949 | Snape | 19/114 |
| 2,660,429 | 11/1953 | Lorig | 474/94 |
| 2,710,500 | 6/1955 | Bolger | 51/242 |
| 2,937,412 | 5/1960 | Hollingsworth | 19/114 |
| 2,941,410 | 6/1960 | Ota | 474/190 X |
| 2,974,631 | 3/1961 | Thompson | 474/92 |
| 2,991,515 | 7/1961 | Rockoff | 474/264 X |
| 3,083,584 | 4/1963 | Nanson | 474/187 |
| 3,140,621 | 7/1964 | Stone | 474/197 X |
| 3,290,729 | 12/1966 | Maynard | 19/114 |
| 3,498,817 | 3/1970 | Stone | 474/190 |
| 3,626,774 | 12/1971 | Schon | 474/190 X |
| 4,140,014 | 2/1979 | Gradoni et al. | 474/190 X |
| 4,368,816 | 1/1983 | Albee | 198/624 |
| 4,408,371 | 10/1983 | Quay | 19/114 |

FOREIGN PATENT DOCUMENTS

63-175315 11/1988 Japan .

Primary Examiner—Ramon S. Britts
Assistant Examiner—Roger J. Shoeppel
Attorney, Agent, or Firm—Armstrong, Westerman, Hattori, McLeland & Naughton

[57] ABSTRACT

A roller for running a flat belt is formed at its surface by an elastic body. Short fibers are mixed with the elastic body. The short fibers are averagely oriented in a direction radially or peripherally inclined to the roller with a small angle and protrude at their tip portions from the roller surface. Owing to a grip force of the protruding short fibers, the flat belt is running, while decreasing a friction coefficient and obtaining a stability to a variation of temperature and humidity. The short fibers may be oriented in a direction axially, peripherally inclined thereto with a specific angle. When a belt guide member is provided to the roller or flat belt, accurate running of the belt is performed.

7 Claims, 7 Drawing Sheets

FLAT BELT DRIVING DEVICE

BACKGROUND OF THE INVENTION

This invention relates to a roller for running a flat belt such as a photosensitive belt, transcription belt, etc. of an electrophotographic machine.

In an electrophotographic machine, for example, it has been known that in order to cut down in weight and size of the machine, a flat belt, formed at its surface by a photosensitive layer or dielectric layer, for training among a plurality of rollers are arranged in substantially parallel with one another is used as a photosensitive belt or a transcription belt, etc. instead of a transcription drum or photosensitive drum.

In this case, the roller for running the flat belt has following problems for forming a accurate image.

(1) When a foreign particle enters between the flat belt and roller, the flat belt may be scratched or dented to cause partial dropping out of an image.

When a foreign particle such as dust, toner, carrier enters between the belt and roller, the roller a surface layer of which is made of metal is liable to be scratched. Since the foreign particle is only put on the surface of the roller, it can be removed easily. However, sever scratches or dents may be caused thereon without buffer function. On the other hand, in case where the surface layer of the roller is made of an elastic material such as a rubber, since the foreign particle is buried on the surface layer, little scratch or dent may be caused. However, it is not so easy to remove the foreign particle, thus the scratches or dents shall be caused repeatedly.

(2) A deviation of the flat belt to one side leads to a breakage of a side end of the belt.

As most of the flat belts used as a photosensitive belt, transcription belt, etc. are made of a material with less ductility and high strength, such as a plastic film, metal leaf. Hence, with such less deformability, the belt cannot absorb a dimensional error in each related part, mounting error of the roller, imbalance of the belt tension, uniformity of the peripheral length of the belt, and so on. As a result, a deviation force which deviates the belt to one side in an axial direction affects during belt running.

In order to prevent the belt deviation, there have been techniques disclosed in Japanese Patent Application Laying Open Gazette No. 56-127501 and 59-205052 in which a guide for preventing the deviation is provided at the belt, and a technique disclosed in Japanese Patent Application Laying Open Gazette No. 57-60347 in which the belt deviation is ceased by a restriction member provided at the roller or vicinity thereof. Nevertheless, when the deviation force increases, the side end of the belt and restriction members may break down. Therefore it has been desired that the roller is made so as no to cause the belt deviation, and even if the belt deviation is caused, so as to easily regulate the deviation.

In order to prevent the belt deviation, it is required to decrease a friction coefficient between the flat belt and roller and the deviation force during belt running (the little deviation force leads to an easy regulation of the deviation). It is further required to maintain stable low friction coefficient independent from temperature and humidity.

(3) A waving flat belt leads to distortion on the image or partial blurred image.

A thin flat belt such as a photosensitive belt used in an electrophotographic machine is apt to be buckled in a width direction to be waved when the flat belt receives large lateral force.

It is desired that the above problems are solved not only in an electrophotographic machine but also in a device requiring an accurate running of the flat belt.

It is therefore an object of the present invention to provide a roller for accurately running a flat belt with a simple construction and a flat belt driving device having the roller which can solve the above problems by preventing the scratches and dents thereat and waving thereof and by decreasing the deviation force during belt running.

SUMMARY OF THE INVENTION

In order to attain the above object, the present invention has a construction as below.

A construction of the roller is that a surface layer of the roller is made of an elastic body mixed with a plurality of short fibers which are averagely oriented in a specific direction and protrude at their tip portions from the surface layer thereof. As a result, the short fibers caused no adhesion between the flat belt and roller, thus easily removing a foreign particle and preventing the flat belt from a scratch caused by the foreign particle. Further, since the short fibers are averagely oriented in a specific direction, a friction coefficient lowers as compared with that of a belt mixed with unoriented short fibers, and a deviation force during belt running lowers, with low deviation force and high stability of the friction coefficient with respect to temperature and humidity. In addition, with the oriented short fibers, since less force in random directions affects to the flat belt, the waving can be prevented.

When the short fibers in the above construction are averagely oriented in a radial direction of the roller in the elastic body, the deviation force during belt running further decreases.

When the short fibers in the above construction are averagely oriented in a direction axially inclined to the roller with a small angle, it is facilitated to manufacture the roller because a rubber sheet or rubber hose can be utilized, being mixed with parallelly oriented short fibers to the surface thereof.

When the short fibers in the above construction are averagely oriented in a direction axially, peripherally inclined to the roller, the flat belt runs in a direction where the short fibers are inclined. Hence, a deviating direction of the flat belt can be limited in one direction and a lateral displacement of the flat belt can be easily restricted with a lower running resistance. In this case, the short fibers are easily oriented by manufacturing a hose mixed with the short fibers by an extruding treatment with a dice having a parallel part and a taper part which continues from the parallel part so as to increase in its diameter.

In case the short fibers are made of aramid resin, the short fibers can easily protrude at their end portions from the surface layer since a rubber grindstone grinds only elastic surface of the roller without cutting the short fibers.

Referring to a flat belt driving device in which a flat belt is trained among a plurality of rollers, at least one of the rollers is made at its surface layer by elastic body mixed with the short fibers and the short fibers protrude at their tip portions from the roller surface. Consequently, slidability of the flat belt and driving accuracy are enhanced thanks to lowered and stable friction coefficient between the belt and roller.

In the above flat belt driving device, the short fibers are averagely oriented in a radial direction of the roller.

When the short fibers are averagely oriented in a direction axially inclined to the roller with a small angle, it becomes easy to orient the short fibers.

When the short fibers are averagely oriented in a direction axially, peripherally inclined to the roller with a small angle, running resistance of the belt further decreases.

In a case where the short fibers are made of aramid resin, the short fibers can easily protrude from the elastic surface.

In the above flat belt driving device, a belt guide member for restricting a lateral displacement of the belt may be provided at the belt in order to stabilize the running of the belt and prevent the belt deviation. In this case, since the deviation force during belt running is small, both the belt guide member and the side end of the belt are prevented from breakage.

In the above flat belt driving device, a belt guide member for restricting a lateral displacement of the belt may be provided in at least one of the rollers in order to stabilize the running of the belt and prevent the belt deviation. In this case, since the deviation force during belt running is small, both the belt guide member and the side end of the belt are prevented from breakage.

DESCRIPTION OF PREFERRED EMBODIMENTS

First Embodiment

A description is made below about a first embodiment of the present invention with reference to FIGS. 1-6.

Figure 1:
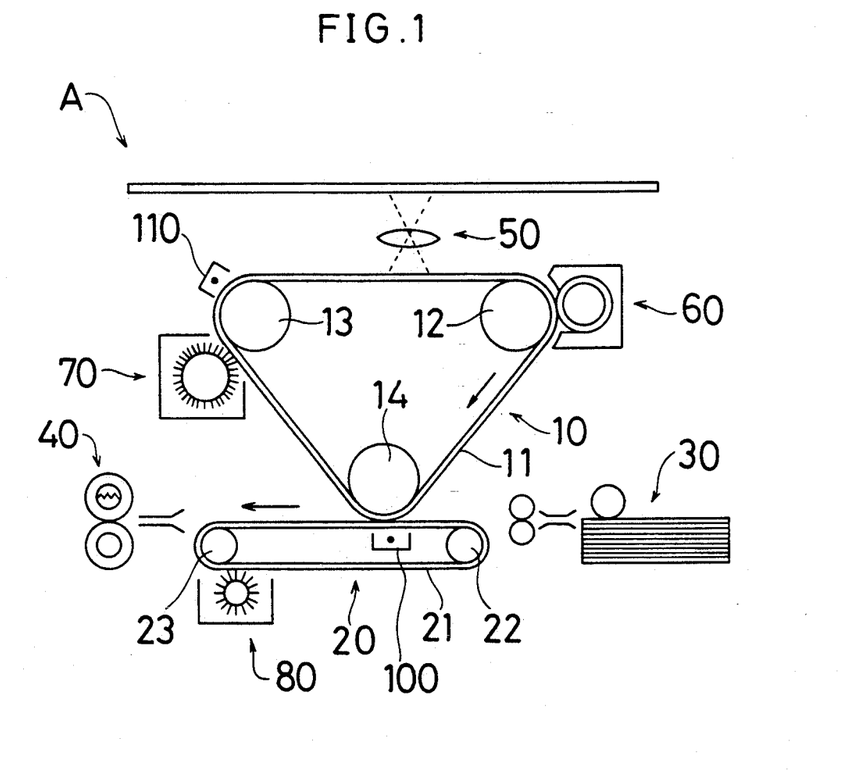
FIG. 1 is an elevation showing a whole construction of an electrophotographic machine in a first embodiment.

FIG. 1 shows an electrophotographic machine A in the present invention. A reference numeral 10 designates a three-roller type photosensitive belt driving device, 20 is a two-roller type transcription belt driving device, 30 is a paper feeder for feeding new paper to the transcription belt driving device 20, and 40 is a fixing system for fixing toner to transcribed paper from the transcription belt driving device 20. Specifically, an image if formed on a photosensitive belt 11 (a flat belt in the present invention) of the photosensitive belt driving device 10 by a lens assembly 50, and then the image is transcribed on paper fed from the paper feeder 30 by the transcription belt driving device 20. Reference numeral 60 designates a developing system for supplying toner to the photosensitive belt 11, 70 and 80 are belt cleaning systems, and 100 and 110 are corona chargers for generating an electric potential on a surface of the flat belt 11 by corona discharge.

In the photosensitive belt driving device 10, reference numeral 12 is a driving roller driven by a motor (not shown in the drawing), and 13 and 14 are respectively a first and second driven rollers. In the transcription belt driving device 20, reference numeral 21 designates a transcription belt, 22 is a driving roller, 23 is a driven roller. Each roller 12-14, 22, 23 is a roller for driving the flat belt 11 in the present invention.

In the photosensitive belt 11, a photosensitive layer is formed on an elastic body. The elastic body is set more than 200 kg/mm$^3$ in its tensile elastic modulus of two-shaft drawn polyester. Wherein, the material of the elastic body may be a metal plate such as nickel, stainless steel, or a plastic film such as PES, PEEK, aramid resin, polyimid resin.

Figure 2:
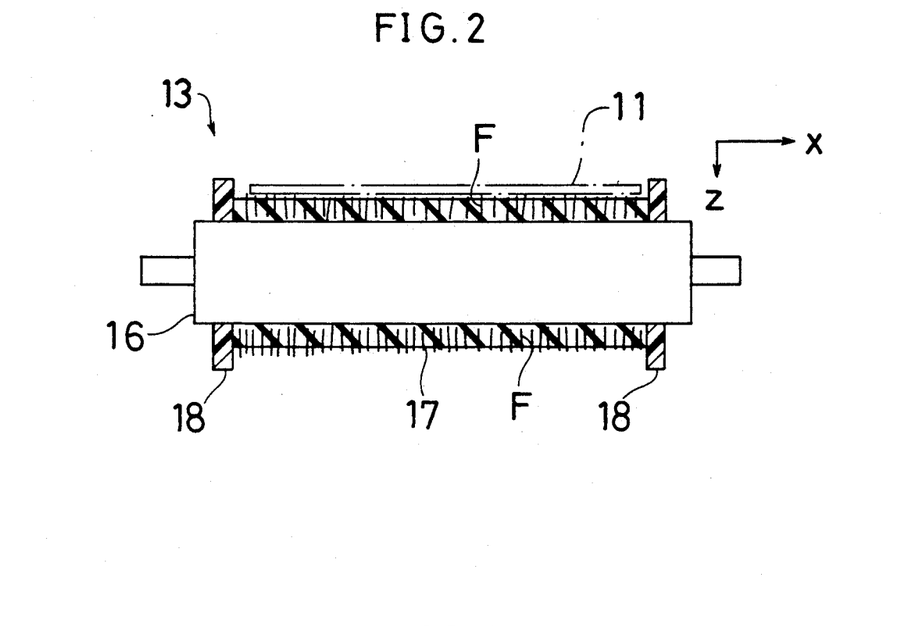
FIG. 2 is a sectional view of a first driven roller of the electrophotographic machine in the first embodiment.

As shown in FIG. 2, the first driven roller 13 is composed of a stepped roll type metal shaft member 16 and a cylinder member 17 being put through by the shaft member 16. Flange members 18 made of metal or slidable plastic are provided at both ends of the cylinder member 17 as a belt guide member for restricting a lateral displacement of the photosensitive belt 11. The flange members restrict the photosensitive belt 11 within a certain running range, as described later.

Figure 3:
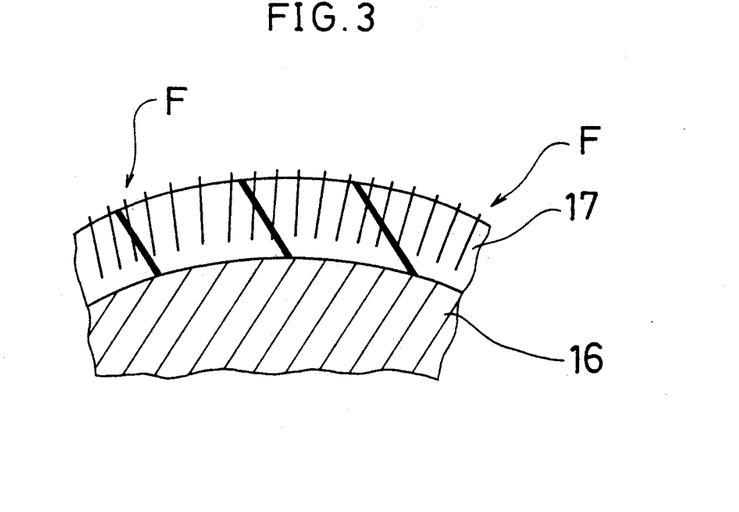
FIG. 3 is a partially transverse sectional view, enlarging a rubber surface layer of the first driven roller in which short fibers protrude therefrom.

The cylinder member 17 is made of an elastic material such as a rubber mixed with short fibers F made from aramid resin. The short fibers F, as shown in FIG. 3, protrude at their tip portions from the surface of the elastic body by grinding with a rubber grindstone, or the like. Each protruding amount thereof is set in a range of 0.01-1 mm.

Figure 4A:
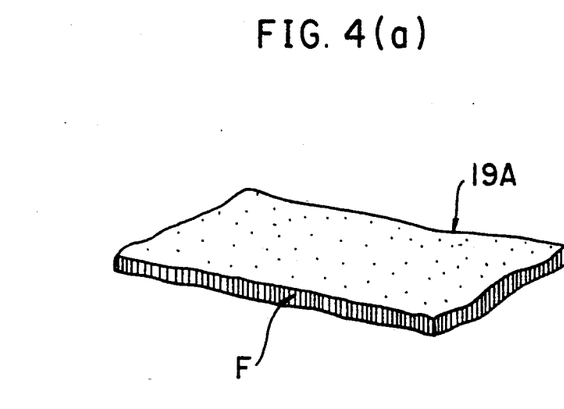
FIGS. 4A and 4B are an explanatory drawings showing a method for manufacturing the roller mixed with the short fibers in the first embodiment.
Figure 4B:
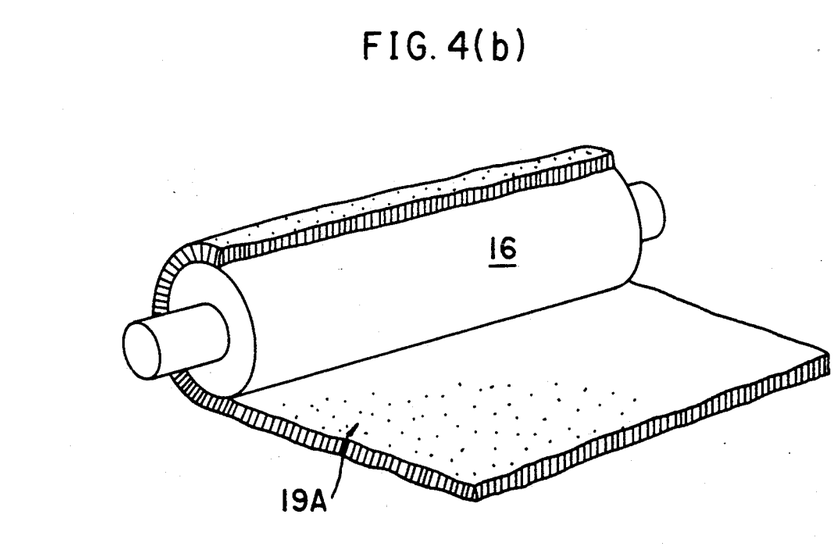

A method of manufacturing the roller 13 is described below. As shown in FIG. 4(a), an unvulcanized rubber sheet 19A is formed, in which the short fibers F are oriented in a thickness direction. The sheet 19A is rolled to the shaft member 16 without disturbing the orientation thereof, as shown in FIG. 4(b), and then is vulcanized integrally.

A surface layer 2 of the roller 13 is ground by a soft grindstone such as a rubber grinder so as to protrude the short fibers F therefrom.

An organic fiber such as PET, nylon, aramid resin, cotton, cerelose, an inorganic fiber such as carbon fiber, an inorganic needlelike filler such as silicon carbide, iron oxide, titan oxide is used as a material of the short fibers F. The length of each short fiber F is preferable to be 1-10 mm.

In case the short fibers F are made of aramid resin, owing to its high rigidity, high slidability at high PV value and high stability to temperature variation, high grip force and low thrust force are displayed under a concentrated load condition. Since the aramid resin has good heat-resistance and comparatively high adhesion to the elastic body such as rubber, the fibers hardly fall out and are hardly cut when ground for protruding the tip portions of the short fibers F from the surface layer 2. Thus, the grinding process is easily performed.

Not only the general rubber material but also thermoplastic elastomer, etc. may be used as the elastic body which serves as a matrix of the cylinder member 17. The thickness of the elastic body is preferably more than 1 mm. In this embodiment, the matrix of the cylinder member 17 is made of EPDM type cross-linking rubber, in which the mixed amount of the short fibers F is 1-150 volume part, preferably 5-50 volume part, with respect to 100 volume part matrix.

The second driven roller 14 has the same construction as the first driven roller 13. The driving roller 22 and driven roller 23 in the transcription belt driving device 20 may have the same constructions.

Test Example of the Present Invention

In this test, 6 denier×3 mm nylon fiber is used as the short fibers. The mixed ratio of the short fibers and chloroprene rubber is 20 to 80 volume %. An extended sheet is obtained by mixing a reinforcing agent, process oil, aging inhibitor, auxiliary agent, vulcanizing agent and raw polymer which does not contain the short fibers, mixing the short fibers so as to be spread therein, and extending by rolling the mixed rubber so that the short fibers are oriented in an extended direction. A sheet in which the short fibers are oriented in a thickness direction is obtained by cutting the extended sheet into a constant width in a width direction, and piling up to joint one another.

A rubber sheet in which the short fibers are oriented in the thickness direction is obtained by rolling up the sheet, and slicing the rolled sheet into a predetermined width at a right angle to an axis thereof.

A roller with 16 mm radius and 270 mm length is obtained by winding the rubber sheet to the shaft member (referring to FIG. 4(b)), gasket vulcanizing it without distributing the orientation of the short fibers, and grinding the surface of the roller so that the short fibers protrude at their tip portions therefrom. The average amount of each protruding portion of the short fibers is 0.3 mm.

Figure 5:
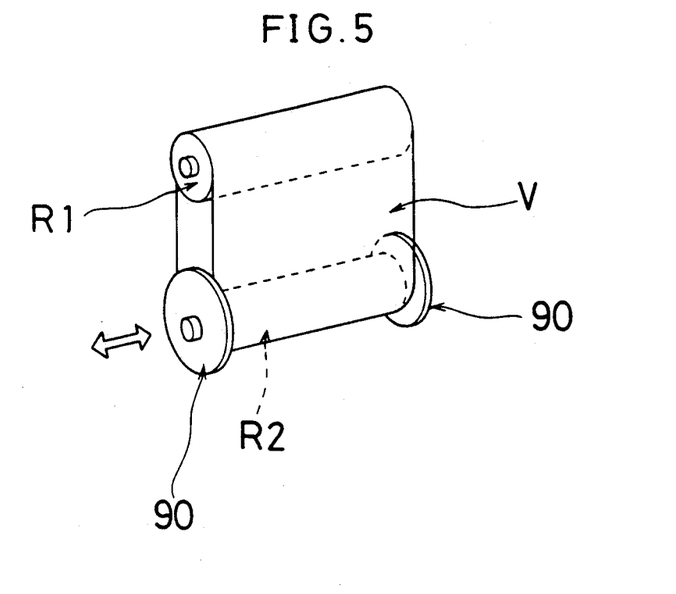
FIG. 5 is a perspective view of an apparatus for measuring a deviation force of a flat belt run by a sample roller in the first embodiment.

As shown in FIG. 5, a seamless belt V with 190 mm diameter, 260 mm width and 0.03 mm thickness is trained between a driving roller R1 and driven roller R2 which are obtained in the above test and are supported in parallel with each other. Flanges 90 are provided at both ends of the driven roller R1 for restricting deviation. Then the force in an axial direction applied to the driven roller R2 is measured as a resistance required for restricting the deviation.

Figure 6:
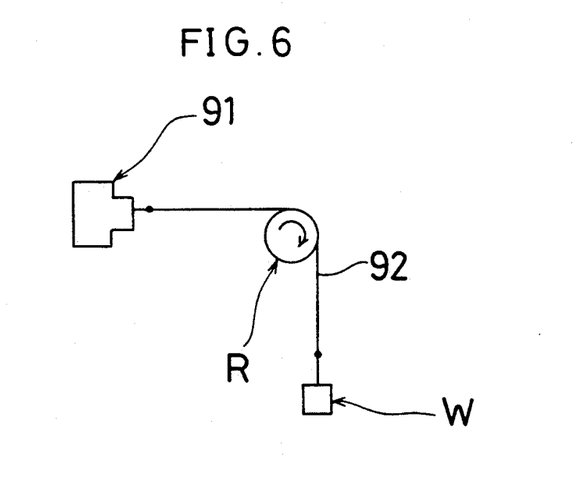
FIG. 6 is a side view of a apparatus for measuring a friction coefficient of the flat belt run by the sample roller in the first embodiment.

Further, a friction coefficient of each roller is measured by an apparatus as shown in FIG. 6. In detail, the friction coefficient is measured by rotating a roller R, one end of a belt being fixed to load cell 91, the other end thereof being applied to load W (=1.8 kgf), and an intermediate part thereof being bent at right angle by being supported by the roller R. This measurement is performed under conditions of 25° C. room temperature, 50% RH and 80% RH humidity.

The measurement results are indicated in Table 1.

TABLE 1

| roller | deviation force | friction coefficient at surface | |
|---|---|---|---|
| | | 50% RH | 80% RH |
| Test Sample | 0.45 kgf | 0.35 | 0.33 |
| Comparative Sample 1 | 1.15 kgf | 1.4 | 1.3 |
| Comparative Sample 2 | 0.45 kgf | 0.38 | 0.36 |
| Comparative Sample 3 | 0.60 kgf | 0.5 | 0.65 |

Wherein Comparative Sample 1 is a simple rubber roller made of chloroprene rubber, having the same shape as Test Sample. Comparative Sample 2 is a roller uniformly planted 1 mm length short fibers in its surface layer and having a same shape as that of Test Sample. Comparative Sample 3 is a same shaped roller as Test Sample having a rubber surface layer of 2 mm thickness which is mixed with unoriented short fibers.

Table 1 indicates that Test Sample has almost the same effect of deviation restriction as the roller planted the short fibers (Comparative Sample 2), and has the same or lower friction coefficient than the roller planted the short fibers.

In the first embodiment, since the cylinder member 17 of the first driven roller 13 is made of the elastic body mixed with the short fibers F which protrude at their tip portions from the surface layer 2 of the cylinder member 17, a contact surface with the photosensitive belt 11 is made rough, so that adhesion of the photosensitive belt 11 and the first driven roller 13 is avoided. In other word, in a case where the belt is adhered to the roller, when a foreign particle such as carrier, a chip of wood or paper enters between the belt and roller in the electrophotographic machine A of the above embodiment, the photosensitive belt 11 is scratched at its both surfaces. However, with the short fibers F, the adhesion of the belt and roller is avoided, so that the scratch can be prevented. Further, the short fibers serve as a brash to remove the foreign particle.

In a case where the belt and roller are adhered each other, since deviation force in an axial direction of the photosensitive belt 11 with large width during belt running increases, the deviation is hard to regulate. However, with the short fibers protruding at their tip portions form the surface layer 2 of the cylinder member 17, such adhesion is avoided, so that the deviation force of the photosensitive belt 11 decreases and regulation of the deviation can be smoothly carried out.

Since the short fibers F are averagely oriented in a specific direction in the elastic body, resistance with respect to belt running, i.e., the friction coefficient is so little that the deviation force further decreases, as compared with that with unoriented fibers mixed.

The friction coefficient between the belt and roller which are adhered each other depends on a condition of an interface and the condition of the interface depends on temperature and humidity. Therefore, since a conventional electrophotographic machine is equipped to a place under various environmental conditions in temperature and humidity, the friction coefficient is liable to vary and the running stability is lowered. On the other hand, with the short fibers F protruding from the surface layer 2, since a grip force owing to the short fibers F affects to the interface between the belt and roller, serving as almost of the friction force, the rigidity of the short fiber F and the matrix forming a base film of the photosensitive belt 11 and visco-elasticity of the elastic body of the cylinder member 17 which depend on the grip force is not so influenced by temperature and humidity within a room environment.

Since the short fibers F are oriented in the cylinder member 17 in a specific direction, less force in an axial direction is received compared with the one in which the short fibers are not oriented, thus decreasing waving owing to buckling in an axial direction.

When the roller in this embodiment is applied to a flat belt driving device, the running stability is enhanced. Particularly, the photosensitive belt and transcription belt are driven accurately, so as to form a clear image.

Second Embodiment

Figure 7:
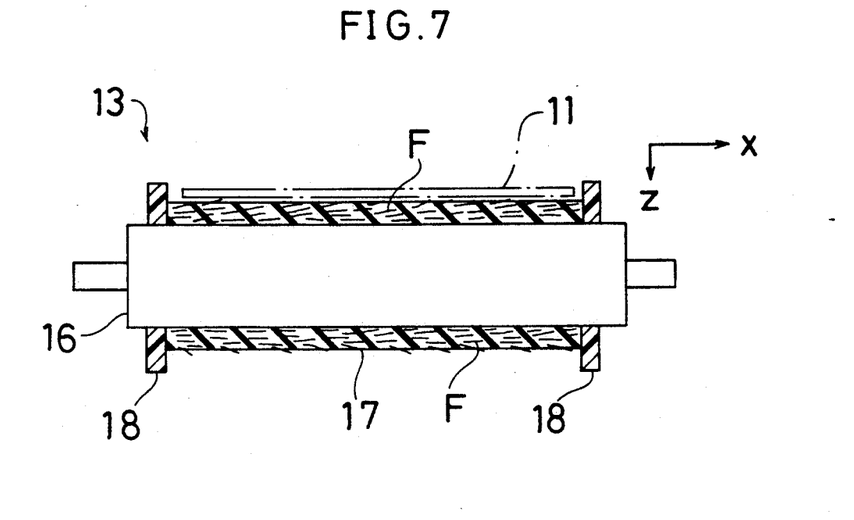
FIG. 7 is a longitudinal sectional view of a first driven roller of a photosensitive belt in a second embodiment.

As shown in FIG. 7, the same first driven roller 13 as in the first embodiment is used in an electrophotographic machine A in this embodiment. The short fibers F are oriented in a direction axially inclined to the first driven roller 13 with a small angle (in X direction in the drawing) and protrude at their tip portions from the roller surface.

Figure 8A:
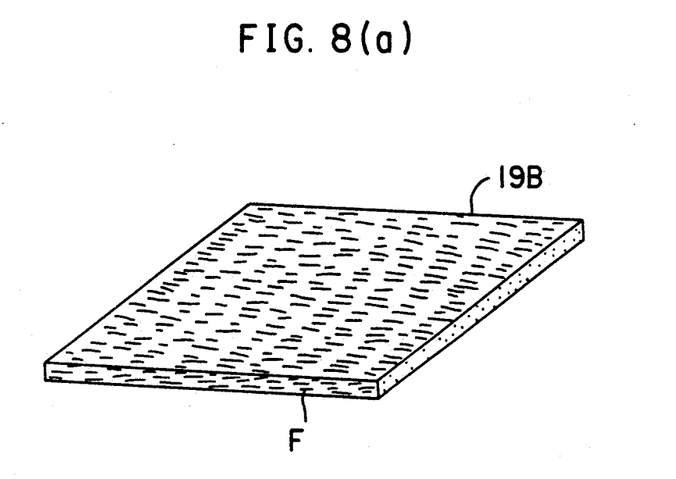
FIGS. 8A and 8B are explanatory drawings showing a method for manufacturing a roller mixed with the short fibers in the second embodiment.
Figure 8B:
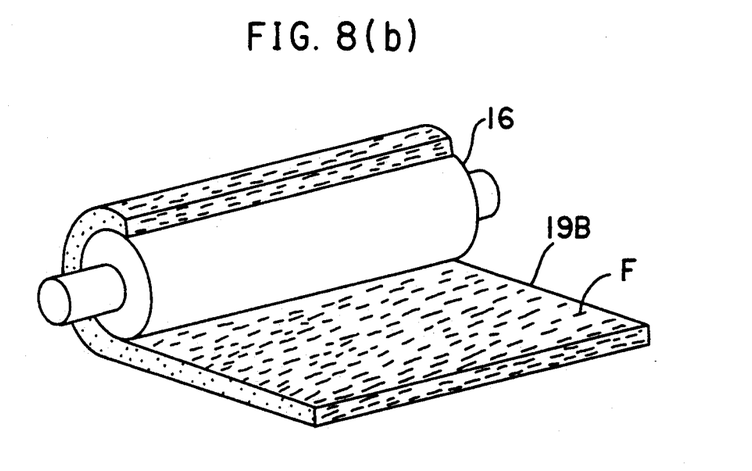

A method of manufacturing the roller of the present invention comprises, as shown in FIG. 8(a), steps of: forming an elastic sheet 19B mixed with the short fibers oriented averagely parallel with a sheet surface by extending treatment; rolling the elastic sheet 19B to the shaft member 16 so that the short fibers F are averagely oriented in an axial direction (refer to FIG. 8(b)); and grinding the roller surface so as to protrude the tip portions of the short fibers F therefrom. Other methods may be utilized as disclosed in U.S. Pat. Nos. 3,423,790, 3,431,164 and 3,651,187 comprising steps of: extruding a hose mixed with the short fibers F by using a dice having a predetermined parallel part so that the short fibers are unevenly but averagely oriented almost in the axial direction of the roller; and grinding the surface layer 2 of the cylinder member 17.

In this embodiment, since the short fibers F are oriented almost in the axial direction of the roller (X direction in the drawing), the manufacturing method is facilitated. In other words, when the short fibers F are oriented in Z direction in the drawing as in the first embodiment, it is required to cut the rubber sheet in which the short fibers F are oriented in parallel with the sheet surface into strips and to join the strips; each other. However, when the short fibers are oriented almost in X direction as in this embodiment, such steps can be omitted because a hose material mixed with the short fibers F may be extruded from the dice having the parallel part, or the rubber sheet in which the short fibers are oriented in X direction can be directly rolled to the roller surface, thus facilitating the manufacturing process with low cost.

Third Embodiment

Figure 9:
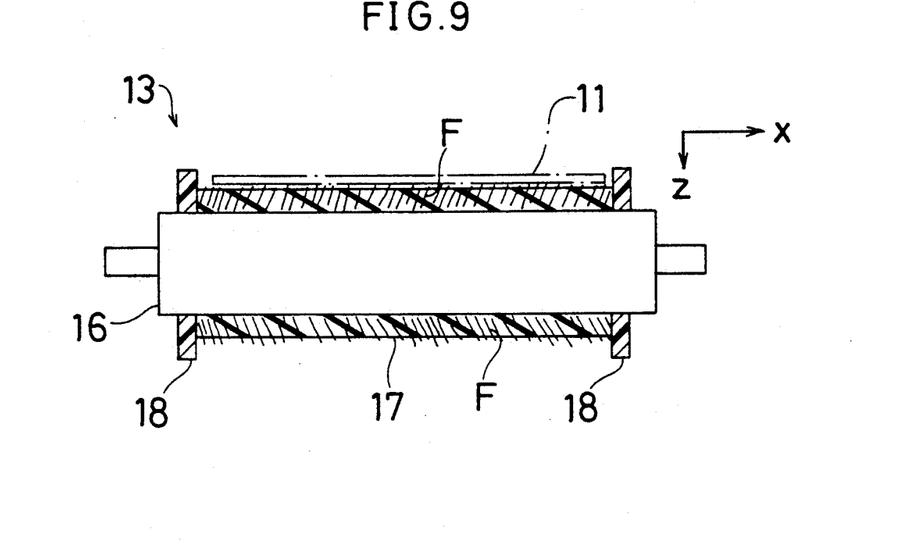
FIG. 9 is a longitudinal sectional view of the first driven roller in the second embodiment.
Figure 10:
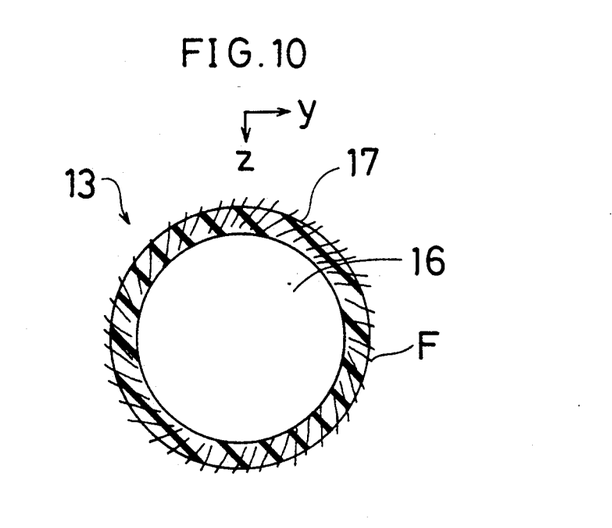
FIG. 10 is a transverse sectional view of a first driven roller in a third embodiment.

A construction of an electrophotographic machine A in this embodiment is as same as in the first embodiment. FIG. 9 shows a construction in vertical cross section of the first driven roller 13 of the photosensitive belt driving system 10 in the third embodiment. Each essential construction of the shaft member 16, a cylinder member 17 and flanges 18 is similar to those of the first embodiment. The short fibers F in the cylinder member 17 are averagely oriented in a direction axially inclined to the roller axis (X direction) with a specific angle, and also oriented in a direction peripherally inclined to the roller axis (Y direction in the drawing) with a specific angle.

In this embodiment, the short fibers F are oriented unevenly but averagely inclined in the axial and peripheral directions of the roller axis (X and Y directions) with a specific angle by utilizing the method disclosed in U.S. Pat. Nos. 3,423,790, 3,431,164, 3,651,187, etc., namely by extruding a hose mixed with the short fibers F from the dice having a parallel part and taper part which continues from the parallel part so as to increase in its diameter. Thus, the manufacturing process can be facilitated. Also, the running resistance can be lowered by setting a rotational direction so as to run the photosensitive belt 11 in a direction to which the short fibers are inclined. Further, since the flat belt is apt to displace laterally in a direction to which the short fibers are inclined, the lateral displacement of the flat belt is easily restricted.

In the first to third embodiments, the short fibers F are mixed to the first and second driven rollers 13, 14. The present invention, however, is not limited to the above embodiments, but the short fibers F may be mixed to only the first driven roller 13, or to all of the rollers 12-14.

When the flange members 18 as belt guide members for restricting lateral displacement of the photosensitive belt 11 is provided at the roller as in each embodiment, the short fibers intervene between the belt and roller, which leads to lowering of the deviation force during belt running and accurate running of the photosensitive belt 11, while preventing breakage of the side end of the belt and generation of rumple.

FOURTH EMBODIMENT

Figure 11:
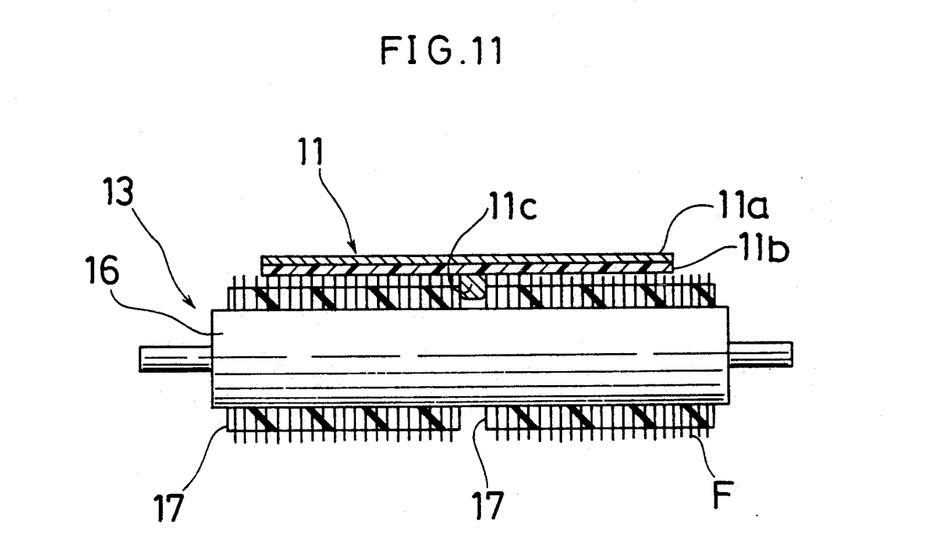
FIG. 11 is a elevation showing an engagement of the roller and flat belt which has a belt guide member in a fourth embodiment.

Description is made below about the fourth embodiment. In this embodiment, as shown in FIG. 11, a belt guide member is provided at the belt. In detail, the photosensitive belt 11 has a laminated construction of a matrix 11a and a photosensitive layer 11b formed on the surface layer thereof. A projection part 11c as the belt guide member is provided at the center of the photosensitive layer 11b. A right and left cylinder members 17 fitted to the shaft member 16 are provided to the roller 13 so as to make a recess at the center. The photosensitive belt 11 runs, while engaging the projection part 11c with the recess. In this case, lateral displacement of the belt in a belt width directions can be restricted by providing only one projection part 11c.

Though flanges are not provided at both side ends of the roller in this embodiment, such flanges may be provided thereat as belt guide members.

This invention is not limited to the roller for running the flat belt and the flat belt driving device of the electrophotographic machine in the above embodiments, but applicable to a roller for a general driving device. Particularly, in a case where the roller is applied to a electrophotographic machine, the photosensitive belt and transcription belt can be run accurately without concerning the variation of the environment conditions such as temperature, humidity, thus maintaining clear images.

Further, this invention is not limited to only a roller for driving the photosensitive belt of the electrophotographic machine and roller for driving the transcription belt in the above embodiment. Also, when the roller is applied in an art required for accurate running and less lateral displacement, desirable features are displayed.

What is claimed is:

1. A flat belt driving device having a plurality of rollers for running a flat belt trained thereto, comprising:

an elastic body with which a plurality of short fibers are mixed for forming at least an outer peripheral belt contacting surface layer on at least one of said rollers, said short fibers being averagely oriented in a specific direction in said elastic body and protruding at their tip portions from the surface of said roller in a range of 0.01 to 1.0 mm.

2. A flat belt driving device defined in claim 1, wherein said short fibers are averagely oriented in a radial direction of said roller in said elastic body.

3. A flat belt driving device defined in claim 1, wherein said short fibers are averagely oriented in a direction axially inclined to said roller with a small angle in said elastic body.

4. A flat belt driving device defined in claim 1, wherein said short fibers are averagely oriented in a direction axially, peripherally inclined to said roller with a small angle in said elastic body.

5. A flat belt driving device defined in claim 1, wherein said short fibers are made of aramid resin.

6. A flat belt driving device as defined in claim 1, wherein said at least one roller includes recess means for receiving a belt guide member provided to a flat belt for restricting lateral displacement of said flat belt.

7. A flat belt driving device as defined in claim 1, wherein said roller is provided with a pair of axially spaced flanges for restricting lateral displacement of said flat belt.

* * * * *